(No Model.) 2 Sheets—Sheet 1.

A. EHEBALD.
GAS METER.

No. 448,643. Patented Mar. 24, 1891.

WITNESSES:
Fred Kempter
Wm M. Shiff

INVENTOR
Adam Ehebald
BY Gifford & Brown
HIS ATTORNEYS

THE NORRIS PETERS CO., PHOTO-LITHO., WASHINGTON, D. C.

(No Model.) 2 Sheets—Sheet 2.
A. EHEBALD.
GAS METER.
No. 448,643. Patented Mar. 24, 1891.
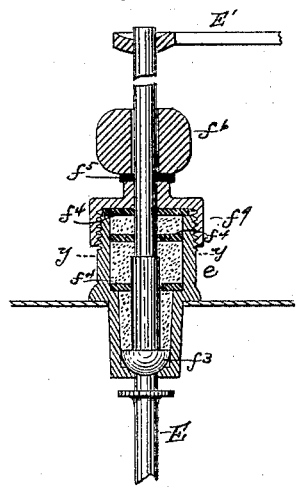
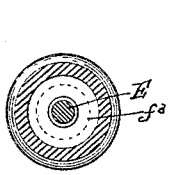
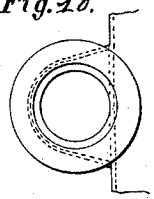
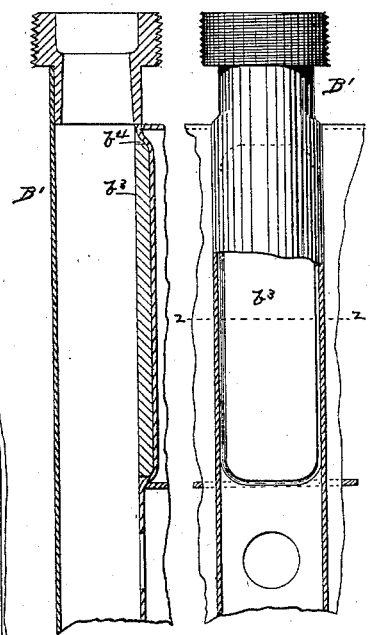
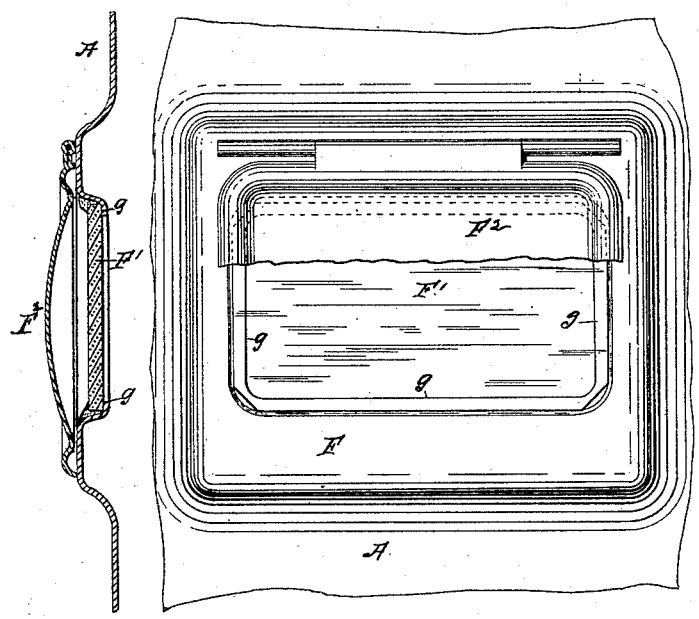
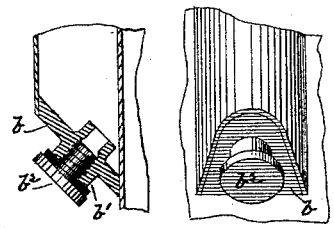
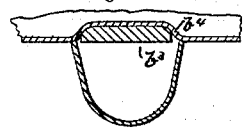
WITNESSES:
INVENTOR
Adam Ehebald
BY Gifford & Brown
HIS ATTORNEYS

UNITED STATES PATENT OFFICE.

ADAM EHEBALD, OF NEW YORK, N. Y.

GAS-METER.

SPECIFICATION forming part of Letters Patent No. 448,643, dated March 24, 1891.

Application filed May 5, 1890. Serial No. 350,689. (No model.)

*To all whom it may concern:*

Be it known that I, ADAM EHEBALD, of New York, county and State of New York, have invented a certain new and useful Improvement in Gas-Meters, of which the following is a specification.

This improvement relates to that class of gas-meters classed as "dry meters;" and it consists in the construction and novel arrangement of parts, as hereinafter specified.

I will describe a meter embodying my improvement, and then point out the novel features in the claims.

Figure 1:
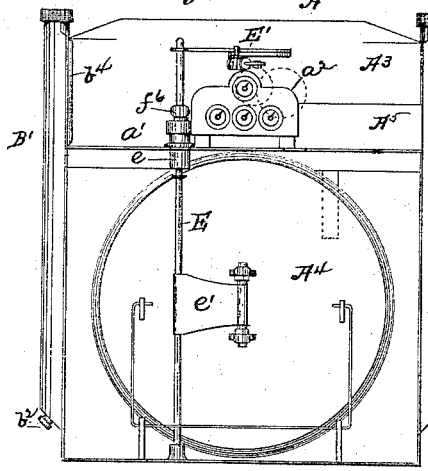
Figure 2:
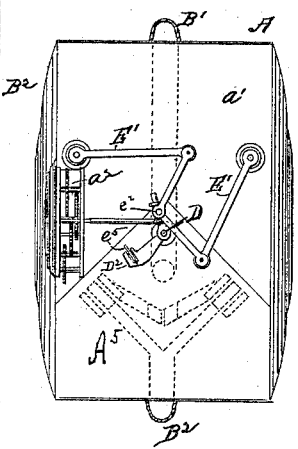
Figure 3:
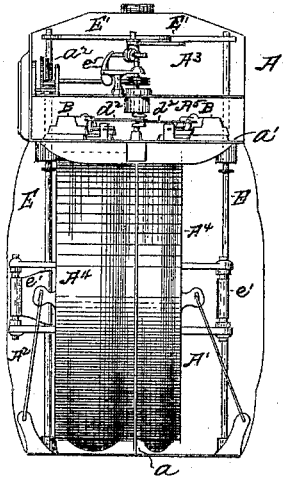
Figure 4:
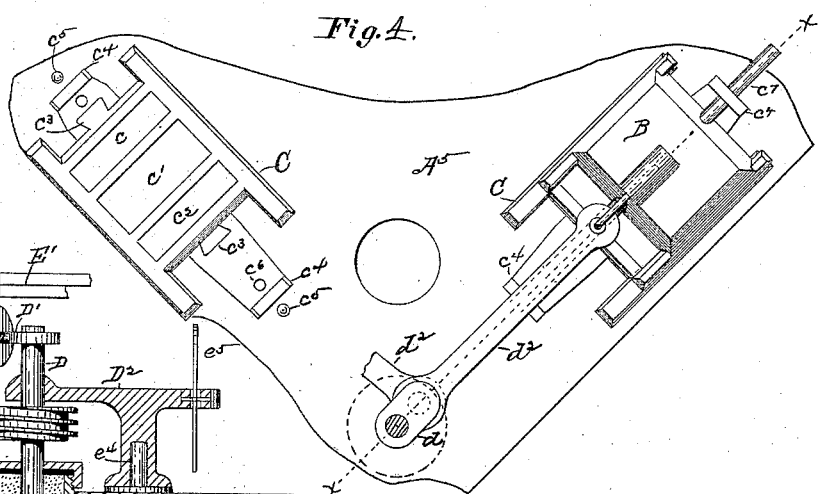
Figure 5:
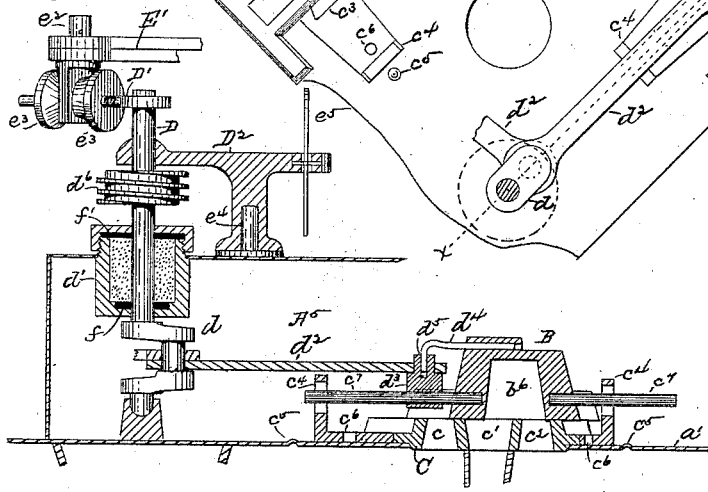
Figure 14:
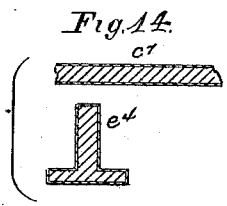

In the accompanying drawings, Figure 1 shows a meter with one of the side walls removed. Fig. 2 shows a top or plan view of certain mechanism within the meter. Fig. 3 shows the meter with an end wall removed. Fig. 4 is an enlarged plan of valve mechanism employed. Fig. 5 is a section through the line $x\,x$ of Fig. 4. Fig. 6 is a vertical section of a stuffing-box. Fig. 7 is a section through the line $y\,y$ of Fig. 6. Figs. 8 and 9 are vertical sections of a gas-inlet, one at right angles to the other. Fig. 10 is a top view thereof. Fig. 11 is a section through the line $z\,z$ of Fig. 9. Fig. 12 is a front view of a door or cover for the dial-work, and Fig. 13 is a vertical thereof. Fig. 14 shows details.

Similar letters of reference indicate like parts in all the figures of the drawings.

Referring by letter to the drawings, A designates a meter-casing divided by partitions $a\,a'$, providing the lower chambers $A'\,A^2$ and the upper chamber $A^3$. The partition $a$ is constructed so that there can be no communication through it from one lower chamber to the other lower chamber, and it also serves as a support for the piston-bellows $A^4$, one on each side. These piston-bellows $A^4$ are alternately operated by the flow of gas and convey motion to the indicator or dial-works $a^2$, which are of the ordinary construction, and need not be fully described herein.

$A^5$ is a gas-receiver within the chamber $A^3$, communicating with the interior of the piston-bellows $A^4$ and with the gas-chambers $A'\,A^2$ through ports in valves B, which I will describe fully hereinafter.

$B'$ designates the inlet for gas, and $B^2$ designates the outlet for gas. These are shown as semi-cylindrical tubes arranged on the outer side of the casing A in the usual manner, and having the usual conduits leading to the interior of the meter.

I have found that the drip-cups heretofore constructed in the bottom of the inlet $B'$ and the outlet $B^2$ are expensive to manufacture, and I therefore construct the bottom of the tubes $B'\,B^2$ as follows: Referring to Figs. 8 and 9, the lower end of the tube is beveled downwardly and inwardly, and a cast-metal bottom $b$ is soldered therein. This bottom $b$ has a hollow lug $b'$ cast integral with it, and the lug is internally-screw-threaded to engage a threaded plug $b^2$.

A meter is sometimes rendered inoperative by boring a hole through the wall of the chamber $A^3$, establishing a communication between the said chamber and the inlet-pipe, so that gas escapes into the chamber $A^3$. To obviate this or prevent a person boring through the wall, I provide this portion of the wall with a hard substance—such, for instance, as glass. I have shown the glass $b^3$ secured in a depression $b^4$ in the meter-wall, so that the face of the glass is on a plane with the wall and extended to the top of the chamber $A^3$. As heretofore stated, gas enters the bellows and chambers $A'\,A^2$ through the valves B.

The valves B slide upon gratings or valve-seats C, secured to the partition $a'$ and provided with ports $c\,c'\,c^2$, one of which $c$ communicates with the chamber $A'$, one $c^2$ with a bellows, and the central one $c'$, which is slightly wider than the others, communicates with the outlet $B^2$. Two of these valves are employed; but while the central port in each leads to the outlet $B^2$ the other ports communicate with opposite bellows and chambers in the usual manner. These valve-seats, and, in fact, all the cast-metal parts of a meter, are generally of soft metal, such as "white metal," and are soldered in place. As a convenient means of holding the valve-seat C in place previous to or during the operation of soldering, I provide it at each end with a lip $c^3$ of dovetail form, seated in a corresponding notch in the base-plate of the guides $c^4$.

As longer valves and valves-seats are sometimes required, the guides $c^4$ must be placed farther apart, and as a means for indicating the proper position of these guides to accommodate a longer valve-seat I provide the upper face of the partition $a'$ with nibs or struck-up portions $c^5$, adapted to engage in the holes $c^6$ in the base-plate of the guides. The valve B has a chamber $b^6$ sufficiently wide to communicate with the port $c'$ and one of the ports $c$ $c^2$ alternately, and said valves are guided in their movements by outwardly-extending rods $c^7$, preferably of polished steel, projecting through slots in the guides $c^4$. These rods are secured in sockets in the valve B, as shown, and are tinned to protect them from rust, as shown in Fig. 14. The valves B are slid back and forth by the pulsations of the respective bellows, to which they are attached by means as follows:

D designates a vertical shaft, having a crank portion $d$ within the chamber $A^5$ and extended through a stuffing-box $d'$ in the top wall of the chamber $A^5$. Arms $d^2$ extend from the crank $d$ to each of the valves B, and as a means for pivotally connecting the arms $d^2$ to the valve I provide a pivot-lug $d^3$ on a rod $c^7$. Instead of a transverse pin, which is usually passed through the pivot-lug above the arm $d^2$ to keep it in place, I employ a soft-wire key $d^4$, which is secured within an opening on the top of the valve B and has its bent end removably inserted in a longitudinal socket $d^5$ in the lug $d^3$. By providing the key described there is no danger of losing it. The shaft D is provided with a worm $d^6$, which engages with and operates the dial-works $a^2$ in the usual manner.

E designates the flag-wires, extended through stuffing-boxes $e$ into the chambers $A'$ $A^2$ and provided with step-bearings at the lower end. There is one of these flag-wires for each of the valves and bellows, and they are connected to the bellows by means of a flag $e'$, having a hinge connection to the head of the bellows, as shown. The flag-wires E have a toggle-lever connection E' with a pivot-stud $e^2$, adjustable longitudinally on a crank-arm D' on the shaft D. The flag-wires do not rotate entirely around, but have a rocking motion imparted to them by the pulsations of the bellows, and this motion, through the agency of the toggle-levers E', rotates the crank-shaft D, thus sliding the valves B. As before stated, the pivot-stud $e^2$ is longitudinally adjustable on the arm D', and as a means therefor the arm D' is threaded and jamb-nuts $e^3$ are provided thereon, one on each side of the stud. By means of these jamb-nuts the amount of play of the toggles E' may be adjusted to vary the rotation of the shaft D, the oscillation of the flag-wire E, and consequently the play of the bellows.

$D^2$ is a standard soldered to a hard metal-tinned stud $e^4$, which projects into an opening in the standard and is soldered to the top wall of the chamber $A^5$. One arm of the standard $D^2$ is provided with a perforation and serves as a bearing for the shaft D above the worm $d^6$, and another arm is provided with a counter-balanced swinging stop $e^5$. This stop $e^5$ is to prevent the shaft D from turning in the wrong direction, and it is therefore pivoted to the standard $D^2$, within the line of rotation of the arm D', in such manner that when the arm is turning in the proper direction it will strike against the convexed side of the stop and bear its lighter end down below the plane of the arm D'. The heavy or counterbalanced end of the stop will cause the stop to resume its vertical or normal position after the arm D' shall have passed it. If the arm D' is turned against the stop in the reverse direction, the stop will prevent further movement of the arm, as the lower end of the stop will strike against the standard and prevent further movement of the upper portion of the stop. This is plainly shown in Fig. 3.

The stuffing-box $d'$ has an interior washer $f$, of leather or analogous material, surrounding the shaft D, and a similar washer $f'$ at the upper end of the box beneath the screw-top $f^2$. A suitable packing may be placed within the stuffing-box.

The flag-wire E has a hard-metal bearing-bulb $f^3$ secured to it and seated in a cup-shaped bearing in the bottom of the stuffing-box $e$. Cork washers $f^4$ surround the flag-wire within the body of the stuffing-box, and a rubber or analogous flexible washer $f^5$ surrounds the flag-wire above the cover of the stuffing-box. These washers bear tightly against the flag-wire and prevent any escape of gas. The cork washers within the stuffing-box are preferably soaked in oil and dipped in paraffine, and a stuffing material is packed in the box at each end of the washers. The cover $f^9$ of the stuffing-box engages the outer side of the box and makes a tighter connection than the covers heretofore employed. A metal weight $f^6$ is loosely mounted on the flag-wire and bears upon the washer $f^5$ and holds it tightly in its place.

In the index-boxes as heretofore made the box is made separate from the meter wall or "front gallery" and soldered thereon, and the glass is placed in the box from the inner side. This is objectionable for the reason that should the glass be broken by accident it cannot be replaced without first removing the box, and, further, the joint between the box and front gallery is liable to leak if gas leaks through the flag-wire stuffing-boxes into the chamber $A^3$. To obviate this I form the index-box F integral with the case or front gallery by the process known as "striking up," and the glass F' is placed in the box from the front—that is, the glass bears against the front face of ledges or flanges $g$, surrounding the opening through the box F, and the glass is cemented in place in the usual manner.

A swinging cover $F^2$ is placed over the glass to protect it.

Having described my invention, what I claim is—

1. In a meter, the combination, with a slide-valve and the arm pivotally connected therewith, of the pivot-lug having the longitudinal socket and the key having one end removably seated in said socket and the other end secured to the slide-valve, substantially as specified.

2. In a gas-meter, the combination, with the flag-wire having the metal bearing-bulb, of the stuffing-box therefor having a seat for the bulb, a cover therefor engaging the outer side of the box, and cork washers surrounding the flag-wire within the stuffing-box, the said washers having a coating of oil and paraffine, substantially as specified.

3. In a gas-meter, the combination, with the flag-wire, of the stuffing-box therefor, the cork washers within said box, a flexible washer surrounding the flag-wire above the cover, and a weight loosely mounted on the wire and bearing upon the washer, substantially as specified.

4. In a meter, the combination, with the flag-wire, of the bearing-bulb thereon, a stuffing-box having a cup-bearing for said bulb, the cork washers within the body of the stuffing-box, and a packing in said box, substantially as specified.

ADAM EHEBALD.

Witnesses:
C. R. FURGUSON,
S. O. EDMONDS.